United States Patent [19]

Handler

[11] Patent Number: 4,920,472
[45] Date of Patent: Apr. 24, 1990

[54] CREST FACTOR CORRECTION CIRCUIT
[75] Inventor: Howard Handler, Westminster, Calif.
[73] Assignee: Deltec Electronics Corporation, San Diego, Calif.
[21] Appl. No.: 359,356
[22] Filed: May 31, 1989
[51] Int. Cl.$^5$ ............................................. H02M 7/44
[52] U.S. Cl. ........................................ 363/95; 363/41; 363/97
[58] Field of Search ....................... 363/41, 95, 96, 97, 363/98

[56] References Cited
U.S. PATENT DOCUMENTS

| | | | |
|---|---|---|---|
| 4,389,708 | 6/1983 | Baldock | 307/492 |
| 4,523,266 | 6/1985 | Nelson | 363/37 |
| 4,680,506 | 7/1987 | Nilssen | 363/132 |
| 4,723,098 | 2/1988 | Grubbs | 363/98 |
| 4,727,470 | 2/1988 | Nilssen | 363/98 |
| 4,745,539 | 5/1988 | Nilssen | 363/98 |

Primary Examiner—Patrick R. Salce
Assistant Examiner—Jeffrey Sterrett
Attorney, Agent, or Firm—Foley & Lardner, Schwartz, Jeffery, Schwaab, Mack, Blumenthal & Evans

[57] ABSTRACT

A crest factor correction circuit for an ac inverter receives inputs including a full-wave rectified output of the ac inverter having a fixed period and a periodic sequence of phase signals that divide each fixed period into predetermined phase intervals. An amplitude and crest factor signal circuit responds to the absolute value signal to provide an amplitude control signal proportional to the negative integral of the difference between the absolute value signal and a set reference voltage. The amplitude and crest factor signal circuit also provides a crest control signal proportional to the negative integral of the difference between the filtered peak value of the absolute value signal and a given reference voltage times a predetermined gain. A series resistor network responds to the amplitude control signal and to the crest control signal and provides a series of tap signals. Each tap signal is proportional to a respective predetermined ratio of the amplitude control signal. The series resistor network also provides a series of crest tap signals. Each crest tap signal is proportional to a respective predetermined ratio of the crest control signal. A multiplexer responds to the predetermined periodic series of phase signals, to the periodic series of tap signals and to the periodic series of crest tap signals to sequentially coupling a sequence of the tap signals followed by coupling a sequence of crest tap signals. The periodic sequence of tap signals and crest tap signals form the composite control signal for controlling the ac inverter.

13 Claims, 5 Drawing Sheets

CREST FACTOR CORRECTION CIRCUIT

FIELD OF THE INVENTION

This invention relates to the field of solid state power conversion circuits and more particularly to the field of control circuits for sinusoidal or quasi-sinusoidal inverters including ac inverters used in un-interruptable power supplies.

BACKGROUND OF THE INVENTION

Inverters typically develop an ac output voltage from a dc source, such as a battery stack, by driving a low-pass filter with a PWM (pulse width modulator) operating at a switching frequency that is much higher than the frequency of the required ac output voltage. The ac output voltage typically has a fixed frequency and therefore a fixed period. An ac inverter with a 60 Hz output frequency will typically have a PWM driving the low pass filter at a frequency of 5 KHz or above. A transformer is conventionally used to achieve isolation between the dc source and the load driven by the ac output voltage.

The invention crest factor correction circuit is used with an ac inverter circuit to vary the duty ratio of the PWM a fixed number of times during each ac output voltage period. The control voltage for controlling the duty ratio of the pulse width modulator in a control system of this type is typically a stepwise or staircase approximation of a sinusoid referred to as a composite control signal. Typical feedback control is achieved by controlling the average or RMS signal of the ac inverter output, or a rectified version of the inverter output.

The amplitude of the composite control signal typically remains constant during each phase interval of each ac output voltage cycle. The constant amplitude of the composite control signal during each phase interval fixes the duty ratio of the PWM during that phase interval. The ac output voltage of the ac inverter is controlled by varying the overall amplitude of the staircase envelope either by average or RMS control.

The loads driven by inverters using the above processes sometimes demand a current only during a short phase interval at the crest interval or peak phase interval of the ac output voltage. Equipment having capacitor rectifier power input stages, such as personal computers, provide a load of this character. Ac inverters using the above control process are capable of adjusting the duty ratio of the PWM only as an average or RMS control, but such adjustments, while perhaps increasing the average or RMS value, may actually flatten the crest value. For high impedance output inverters, a subsequent increase in load will further reduce the peak inverter output.

Commercial electronic equipment operating on the ac output voltage of an ac inverter typically monitor the amplitude of the peak swing or crest of the ac output voltage for the purpose of determining if the power is suitable for continued operation. In the average or RMS feedback control as described above, the probability of inadvertent equipment shut down is increased as workstations, including added rectifier capacitive loads, are placed on the line and as crest voltage clipping increases.

SUMMARY OF THE INVENTION

An object of the invention is to use a first control loop to control the amplitude of the voltage steps in a leading phase interval and in a trailing phase interval of a composite control signal having the shape of a staircase approximation of a full-wave rectified sine wave.

Another object of the invention is to use a second control loop to control the amplitude of the voltage steps in the crest phase interval of the composite control signal occurring between the leading and trailing phase intervals.

In accordance with the principles of the invention, a control circuit is provided for generating a composite control signal to a control input of an ac inverter. The ac inverter provides an ac output from a dc power source. The control circuit comprising first circuit, receiving the ac output of the ac inverter, for generating an amplitude control signal based on one of an average or RMS value of said ac output; a second circuit, receiving the ac output of said ac inverter, for generating a crest control signal for controlling the amplitude of the peak value of said ac output; and a third circuit connected to the first and second circuit and to said control input of the ac inverter, for feeding said amplitude control signal and said crest control signal to the control input of the ac inverter as the composite control signal.

More particularly, the output voltage of the ac inverter is sensed and full wave rectified to provide an absolute value signal. The first control loop senses the absolute value signal and provides an amplitude control signal that is proportional to the negative integral of the difference between the absolute value signal and a precision reference voltage.

A peak detection circuit senses the absolute value signal and provides a scaled filtered peak value signal that is proportional to the filtered peak value of the absolute value signal.

A second control loop senses the scaled filtered peak value signal and provides a crest control signal that is proportional to the negative integral of the difference between the scaled filtered peak value of the absolute value signal and a predetermined reference voltage.

The invention crest factor correction circuit receives a periodic sequence of phase signals from a phase signal bus that divide each fixed period of the absolute value signal into a predetermined number of equivalent phase intervals.

A first series network or ladder is driven by the amplitude control signal. The ladder is taped to provide a set of leading and trailing phase tap signals that characterize the amplitude of the leading phase and trailing phase portions of the composite control signal. The amplitude of the voltage steps in the leading and trailing phase tap signals are controlled by the amplitude of the amplitude control signal driving the first series network.

A second series network or second ladder is driven by the crest control signal and is taped to provide a set of crest phase tap signals that characterize the amplitude of the crest portion of the composite control signal. The amplitude of the crest phase tap signals during the crest phase interval is controlled by the amplitude of the crest control signal driving the second series network.

A multiplexer controlled by the periodic sequence of phase signals sequentially couples a set of leading phase tap signals to an output terminal, then sequentially couples the set of phase tap signals to the output terminal and then sequentially couples the set of trailing phase tap signals to the output terminal.

DETAILED DESCRIPTION OF THE PREFERRED EMBODIMENTS

Figure 1:
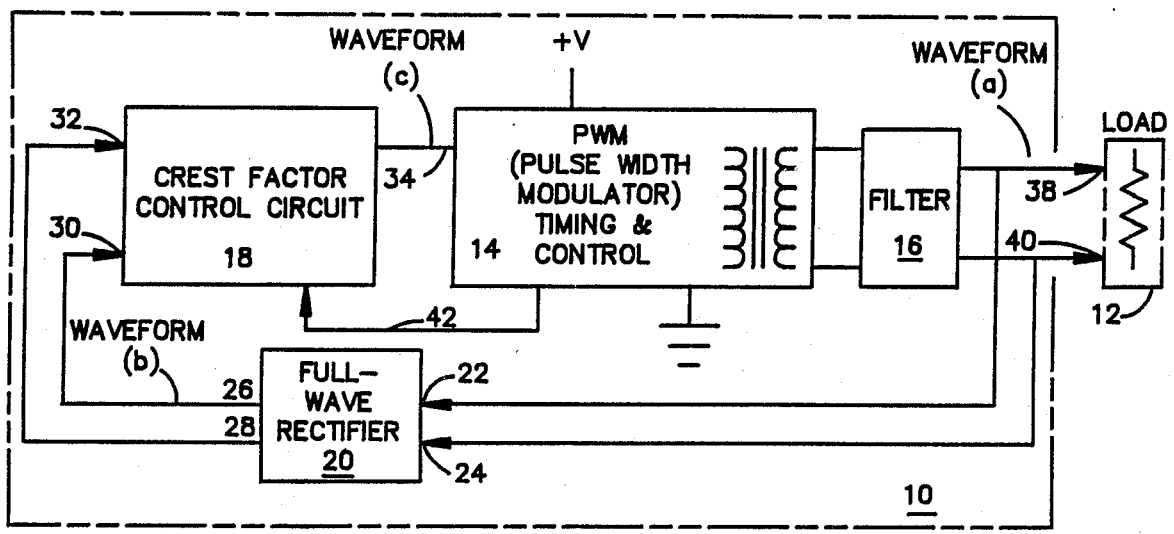
FIG. 1 is a block diagram showing the invention crest factor control circuit coupled as a control function to control a PWM within an ac inverter.
Figure 2A:
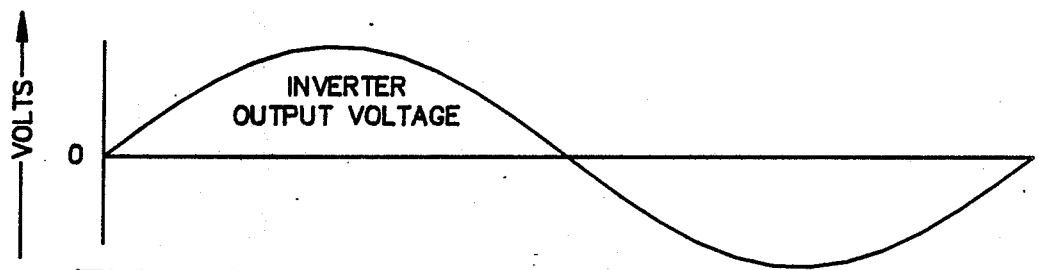
FIGS. 2a, 2b, and 2c are graphs of waveforms a, b, and c, respectively, characterizing the output voltage of the ac inverter, an absolute value signal and a composite control signal to a PWM as a function of time.

Phantom block 10 in FIG. 1 is a simplified block diagram of an ac inverter for converting energy from a dc voltage source V+ (such as a battery, not shown) into an ac or sinusoidal output voltage of the form represented by waveform (a) in FIG. 2a. The output voltage is coupled to load 12. An ac inverter typically uses a PWM (pulse width modulator) 14 to form the output voltage into a "quasi" or near sinusoidal shape. Filter 16 smooths the waveshape by suppressing harmonics above the fundamental frequency of the output voltage.

Figure 2B:
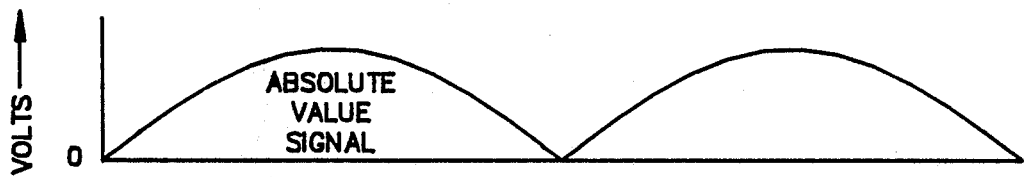

Full-wave rectifier 20 of FIG. 1 is coupled to receive the output voltage at its input terminals 22, 24 and converts the sinusoidal waveform into a rectifier or absolute value signal as shown by waveform (b) in FIG. 2b. The full-wave rectifier outputs the absolute value signal at rectifier output terminals 26, 28.

Figure 2C:
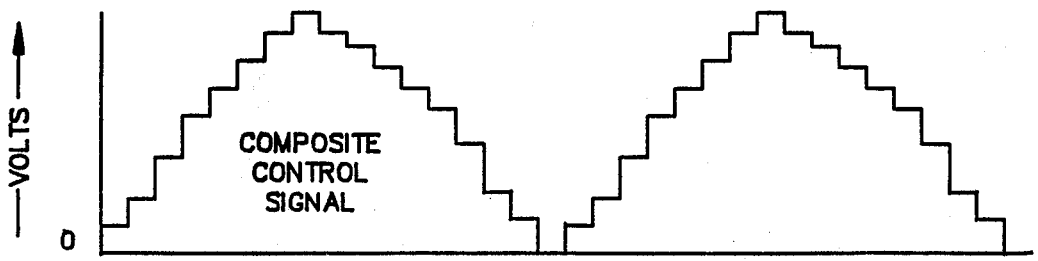

A crest factor correction circuit 18 in accordance with the invention receives the absolute value signal on signal lines 30, 32. The crest factor correction circuit 18 provides a composite control signal, with a shape such as waveform (c) in FIG. 2c and waveform (d) in FIG. 4, to the input of the PWM on signal line 34 to control the average amplitude and the peak amplitude of the inverter output voltage of the ac inverter 10 at the load terminals 38, 40. The timing of the crest factor control circuit 18, in providing the composite control signal, is provided by a periodic sequence of phase signals coupled from the PWM 14 to the crest factor control circuit on signal bus 42.

Figure 3:
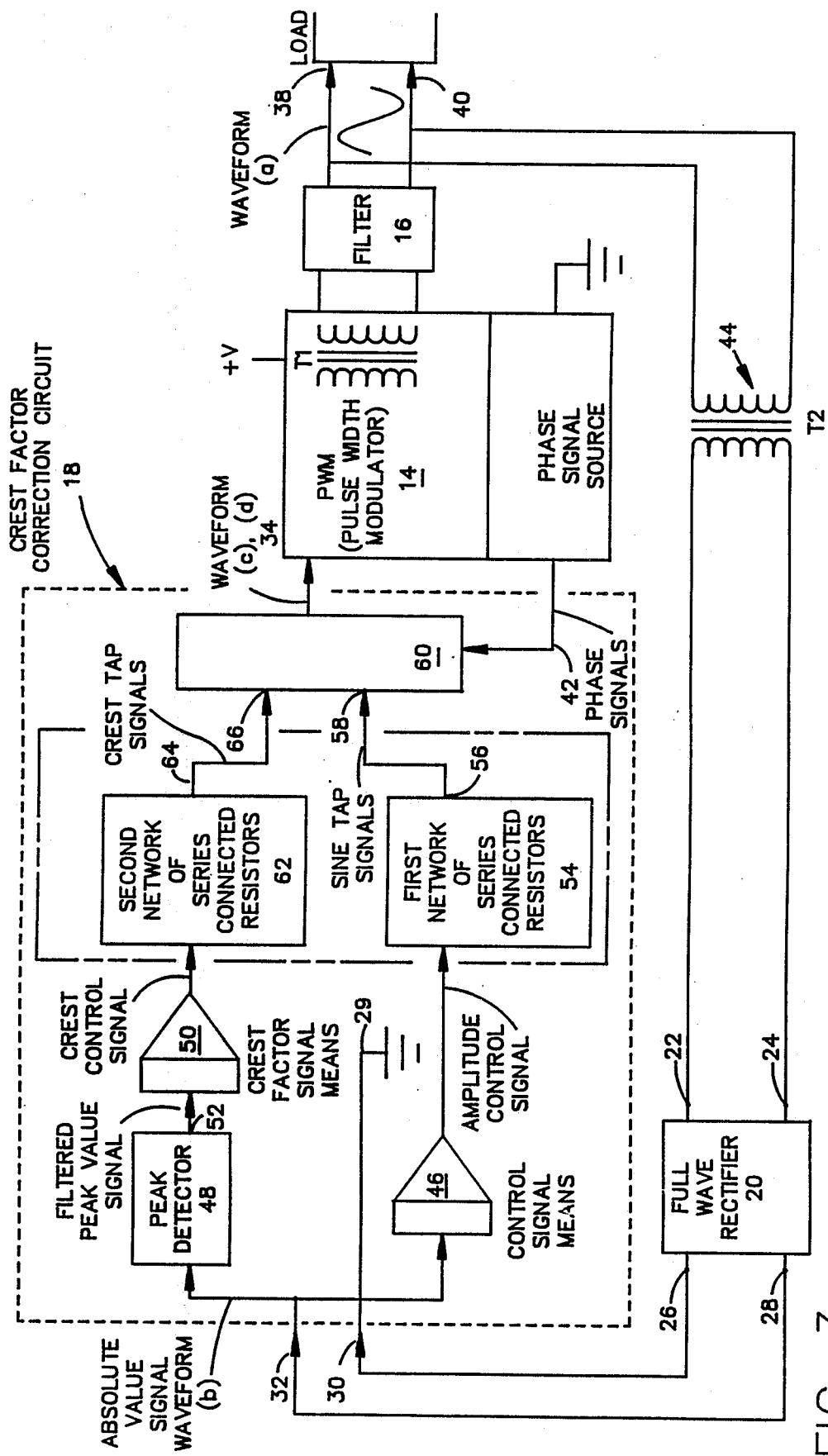
FIG. 3 is an expanded block diagram of the invention crest factor control circuit coupled into the inverter of FIG. 1, FIGS. 4a and 4b are graphs of waveforms d, e and f characterizing the composite control signal output of the invention circuit, the ramp signal to the modulator within the PWM and the resulting output "on" time of the PWM switch in response to the correspondence of the amplitude of the composite control signal amplitude with the ramp signal.

FIG. 3 is a block diagram that shows the crest factor control circuit within phantom block 18 in greater detail. Transformer T2, 44 provides ground isolation from load terminals 38, 40 to full-wave rectifier input terminals 22, 24. The full-wave rectifier 20 provides the absolute value signal, with a shape such as waveform (b), by full-wave rectifying the ground isolated ac output of isolation transformer T2 as the input terminals of transformer T2 sample the inverter output voltage.

The ac output voltage of the inverter has a substantially fixed period. The period of the inverter output voltage is established by a conventional free running oscillator or clock system (not shown) in PWM 14. The absolute value signal is also substantially fixed in period since it is derived directly from the inverter output voltage. The frequency of the absolute value signal is twice the frequency of the inverter output voltage.

The crest factor control circuit 18 of FIG. 3 is timed by a periodic sequence of phase signals coupled from the phase signal source in PWM 14 to the crest factor control circuit on signal bus 42. The invention crest factor control circuit receives the periodic sequence of phase signals as a sequence of 4 bit binary words from a binary counter that starts at 0000 and counts to 1111. The counter then resets to 0000.

The binary words are received by the invention crest factor control circuit 18 for each fixed period of the absolute value signal. Each successive phase signal is characterized to define a predetermined successive phase interval of the absolute value signal. FIG. 4 shows the fixed period divided into 15 phase intervals, each phase interval being 12 degrees in duration.

Referring to FIG. 3, integrator circuit 46 represents a control signal means that responds to the absolute value signal from full-wave rectifier terminal 28 via signal line 32. The output of circuit 46 provides an amplitude control signal that is proportional to the negative integral of the difference between the absolute value signal and a reference voltage, such as precision zener regulator reference voltage of 6.2 Vdc. The amplitude control signal at the output of circuit 46 is not shown but typically has a fairly constant value.

Block 48 of FIG. 3 represents a peak detection circuit means (e.g. FIG. 5, element 48) that responds to the absolute value signal from rectifier terminal 28 via signal line 32 to provide a filtered peak value signal at terminal 52 that is proportional to the filtered peak value of the absolute value signal. Integrator circuit 50 represents a crest factor signal means that responds to the filtered peak value signal from the peak detector circuit 48. The output of integrator circuit 50 provides a crest control signal that is proportional to the negative integral of the difference between the filtered peak value of the absolute value signal and a reference voltage.

Block 54 of FIG. 3 represents a first series network means that responds to the amplitude control signal from the integrator circuit 46. The first series network means 54 comprises a plurality in series connected resistors and provides a set of sine tap signals via signal bus 56 to a set of multiplexer leading and lagging phase interval terminals 58 on multiplexer 60. Each sine tap signal within each set has a corresponding phase interval. Each sine tap signal is substantially proportional in amplitude to the amplitude control signal times the sine of the angle corresponding to the respective phase interval. Block 62 in FIG. 3 represents a second series network means that responds to the crest control signal from the output of integrator circuit 50. The second series network means comprises a plurality of series connected resistors and provides a set of crest tap signals via signal bus 64 to a set of multiplexer crest input terminals 66 on multiplexer 60. Each crest tap signal in the set has a corresponding phase interval. Each crest tap signal is substantially proportional in amplitude to the amplitude of the crest control signal times the sine of the angle corresponding to the respective phase interval.

Block 60 in FIG. 3 represents a multiplexer means (e.g. CD 4067, 16 channel multiplexer) that is responds to the predetermined periodic series of phase signals from signal bus 42. The phase signals control the sequence in which the multiplexer connects the set of sine tap signals from the first series network means via signal bus 56 and the set of crest tap signals from the second series network means via signal bus 64 to an output terminal 34 to provide the composite control signal.

Figure 4A:
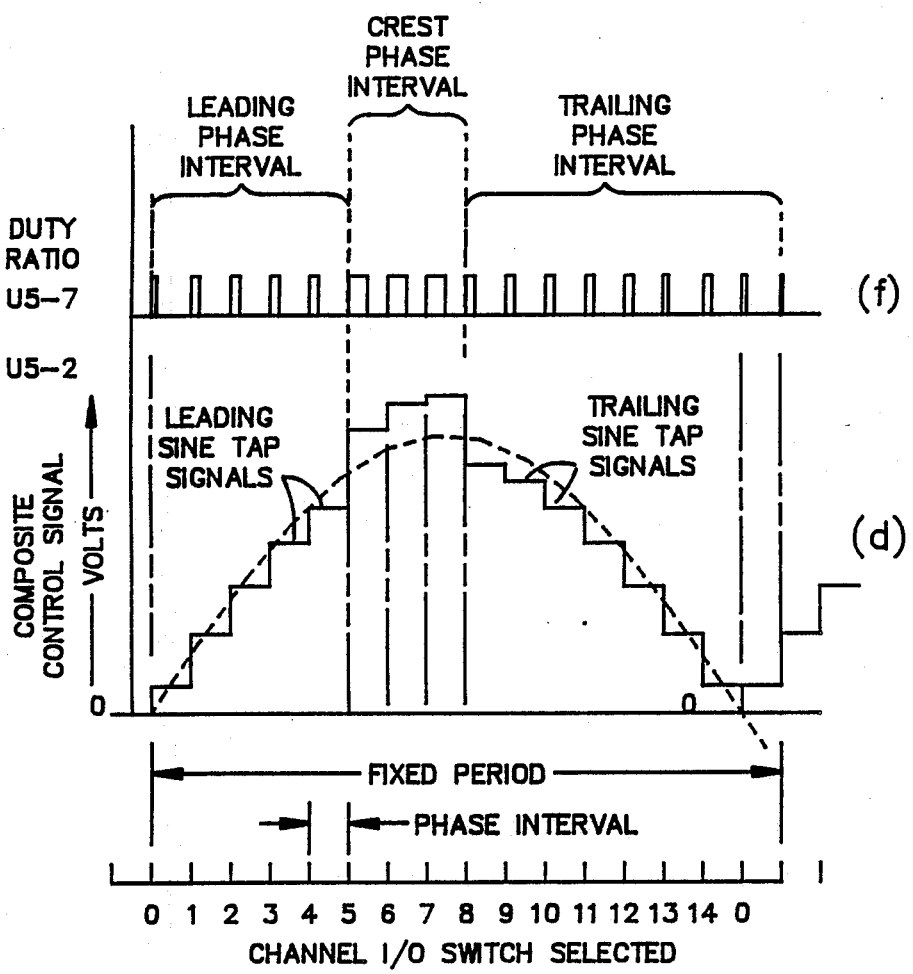
Figure 4B:
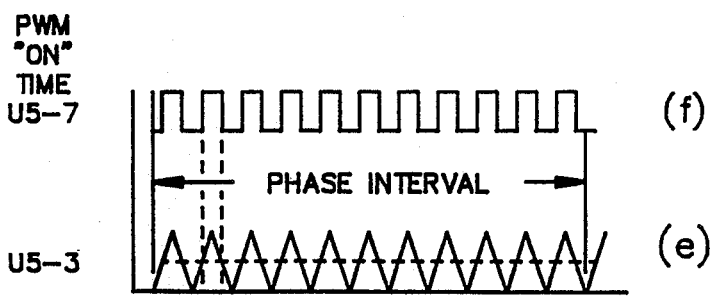

The shape of composite control signal is more clearly characterized in FIG. 4a. Each period is divided into three phase intervals. The sine tap signals establish the amplitude of the composite signal during the leading phase interval and during the trailing phase interval. The crest tap signals establish the amplitude of the composite signal during the crest phase interval interposed between the leading and trailing phase intervals.

Figure 5:
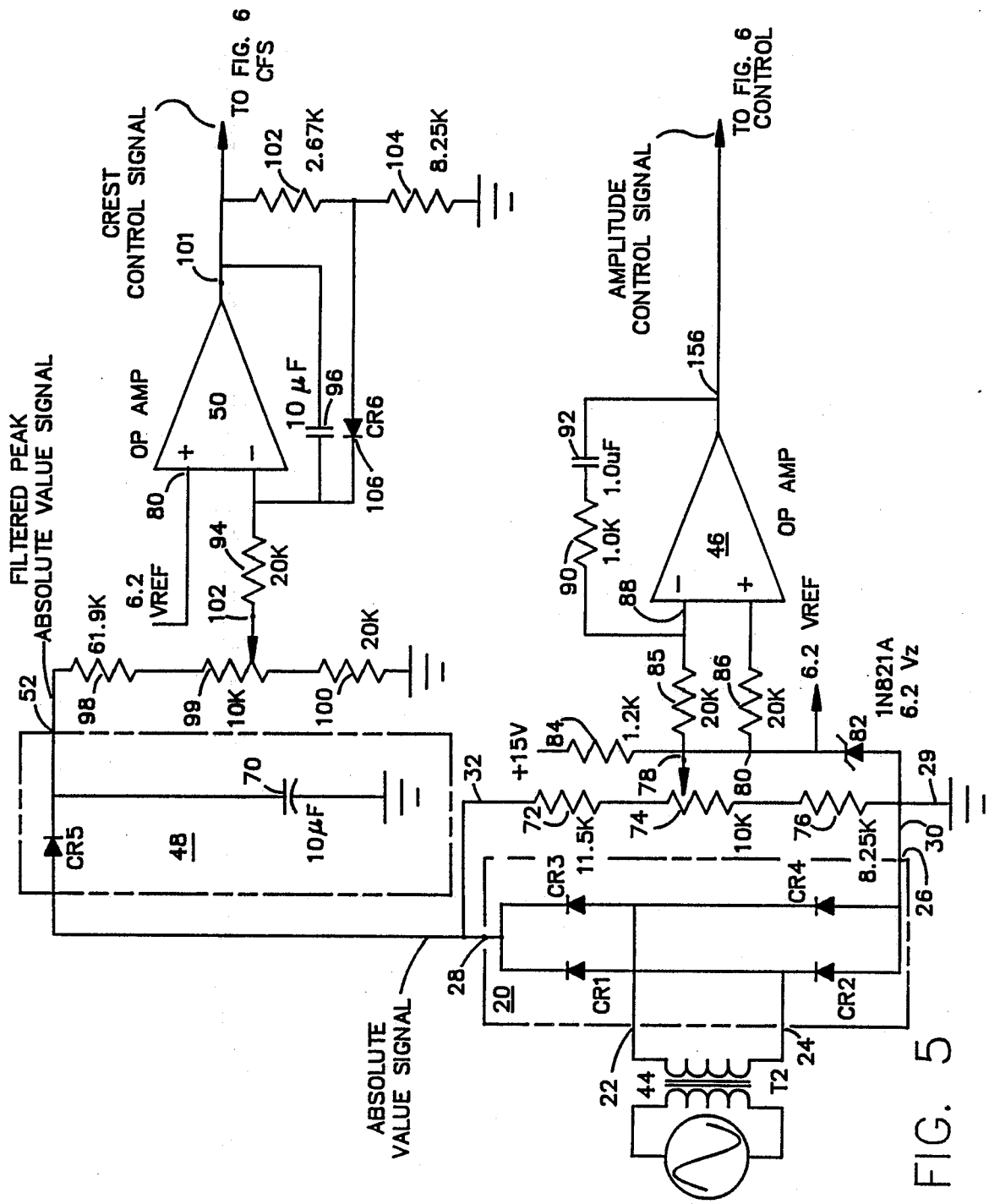
FIG. 5 is a schematic of the sensing and integration section of the crest factor correction circuit.
Figure 6:
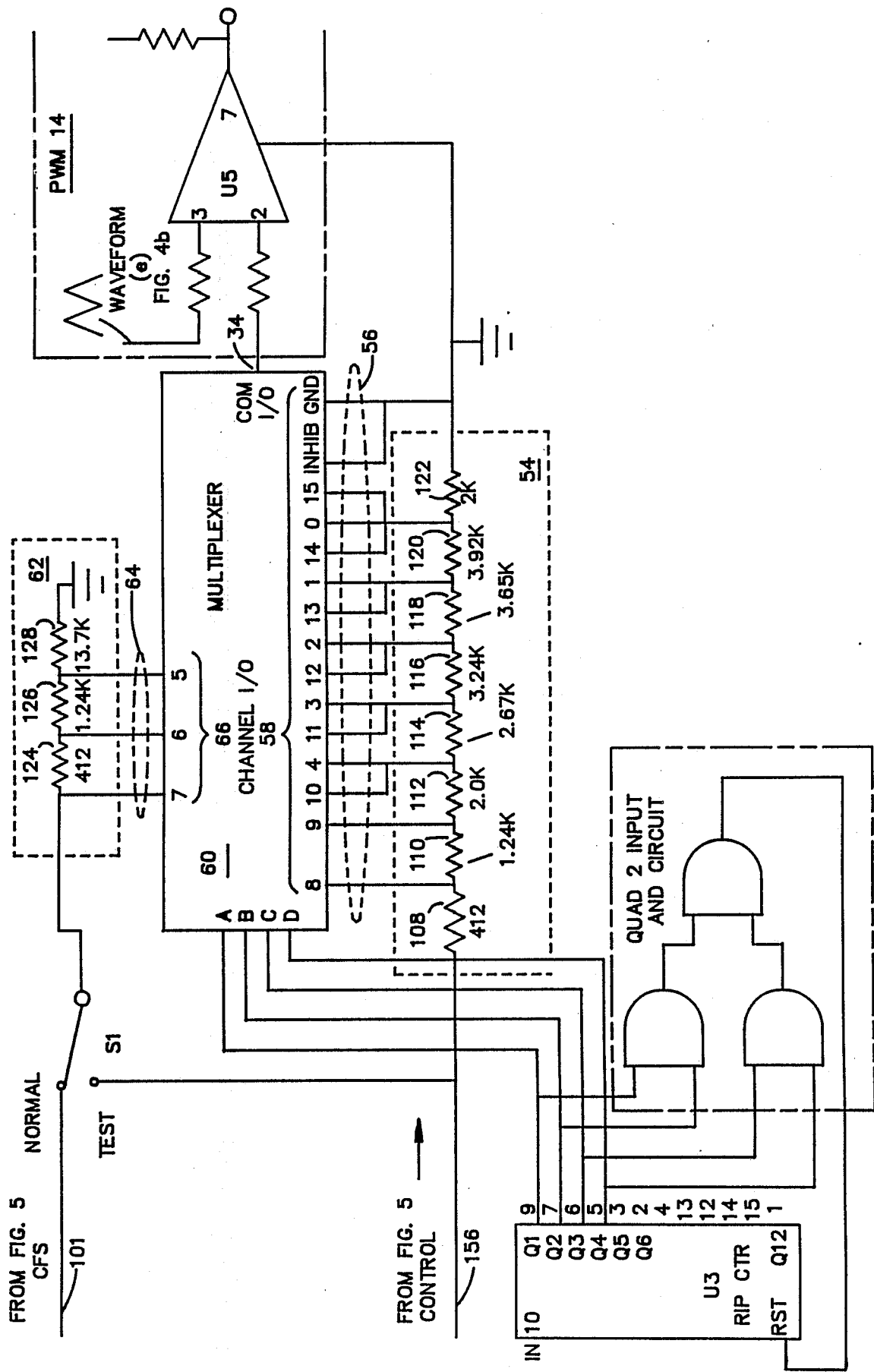
FIG. 6 is a schematic of the ladder and multiplexing section of the invention crest factor correction circuit.

As shown in FIG. 4a, waveform (d), the leading phase interval, of the preferred embodiment of the circuit of FIGS. 5 and 6, is approximately 60 degrees in duration and is divided by 5 equal phase intervals The first sequence of sine tap signals corresponding in time to multiplexer I/O switches 0–4 (see FIG. 6) are coupled to the output 34 over the first 60 degrees. A sequence of crest tap signals corresponding in time to I/O switches 5, 6 and 7 are then coupled to output 34. The amplitude of the steps during the crest phase interval occupy the next 36 degrees of the waveform (d) as they are coupled to output terminal 34. I/O switches 8–14 are then selected in sequence over trailing phase interval of 84 degrees of phase by equally spaced phase signals. As the number of I/O switches available is increased in a particular design, and the number of resistors in the first and second networks is increased correspondingly, the fidelity of the control signal (c) and (d) to a true half sine wave is increased. An increase in the fidelity of the control signal to better approximate a half sine wave is desirable because it tends to assist filter 16 in producing a clean sinusoidal inverter output voltage at the load terminals 38, 40.

Waveform (d) in FIG. 4 depicts a signal that represents the composite control signal as a function of fifteen phase intervals that take place over the fixed period representing one half of the ac inverter output voltage cycle interval. Each phase interval represents twelve (12) degrees of the fixed period.

Each of the phase intervals are defined by the selection of a particular channel I/O switch of multiplexer 60. The sequential selection of I/O switches 0–4 controls the amplitude of the composite control signal during the leading phase interval of 60 degrees. The sequential selection of I/O switches 5–7 controls the amplitude during the crest phase interval from 60 degrees to 96 degrees and the selection of I/O switches 8–14 control the amplitude of the composite control signal during the trailing phase interval from 96 degrees to 180 degrees. Each periodic set of a first sequence of sine tap signals, followed by a sequence of crest tap signals, followed by a second sequence of sine tap signals comprise the composite control signal at output terminal 34.

FIG. 4a shows that crest phase interval is timed to lead the center of the fixed period. The crest phase interval of FIG. 4a starts at phase interval 5 to time the crest control signal to increase the duty ratio of the PWM 14 in advance of the crest of the reference sine wave (shown in phantom). The amount of phase lead that is necessary for the start of the crest phase interval depends on several factors.

Within each fixed phase interval, the operating duty ratio of the PWM modulator stage (not shown) remains fixed. The PWM gradually compensates for an abrupt change in the output load current during the crest phase interval over several fixed periods as the crest control signal increases in value in response to a reduced or clipped peak output voltage to the load.

The typical PWM 14 (FIG. 1) provides output current to the load via lead 38 through an output LC filter 16 well known in the art. The LC filter imposes a bandwidth limitation on the response characteristic of the PWM. The filter 16 typically has a characteristic phase lag of 20–30 degrees. The inductor within filter 16 operates in series with the load and typically has a value of several hundred microhenries which contributes to limiting the rate of increase of output current passing through the inductor to the load.

A crest phase interval timed to lead by 20 to 30 degrees is believed to provide the lowest distortion for loads having a large number of peak rectifiers on the service. By recognizing the inherent lag of the PWM and by matching the lead of the crest phase interval to the dynamic characteristic of the PWM, as shown in the waveform (d) of FIG. 4a, voltage distortion is typically reduced to less than 4%.

Timing the crest phase interval to be symmetrical with or central to the fixed period of FIG. 4a increases the measured voltage distortion on the output voltage to unacceptable levels.

Referring to FIG. 5, transformer T2 is shown driving a full-wave rectifier within phantom block 20 comprised of diodes CR1–CR4. The full-wave bridge outputs an absolute value signal at the cathodes of CR1, CR3 at terminal 28 with respect to a reference potential, such as ground at terminal 29.

Phantom block 48 of FIG. 5 provides a peak detection circuit comprised of CR5 and capacitor 70. Capacitor 70 filters the peak detected value of the absolute values signal sensed by the anode of CR5.

The resistor string comprised of resistors 72, 74 and 76 is driven by the absolute value signal at terminal 26 and terminated at reverence potential, or ground terminal 29. Potentiometer 74 provides a tapped value of the absolute value signal waveform (b) at terminal 78 that is scaled to be within the linear range of the integrator circuit or op amp 46 (e.g. LM 301A) and to have an average value with the inverter output voltage at nominal value equal the reference voltage VREF of approximately 6.2 Vdc at terminal 80.

The reference voltage is provided by a typical zener reference circuit of 6.2 volts using a precision zener reference diode 82 having a Vz of 6.2 volts. Resistor 84 has a value calculated to bias the zener reference diode at a point at which its temperatures coefficient is lowest.

For the purpose of explaining the operation of the circuit, assume that the voltage at terminal 80 remains at VREF. The + or non-inverting input to op amp 46 demands virtually no current, so there is no voltage drop across resistor 86. The non-inverting input to op amp 46 is therefore at the VREF potential.

Op amp 46 is a high gain operational amplifier that will move its output as required, to maintain its inverting input 88 at the same potential as its non-inverting input. As the voltage at terminal 78 increases above the VREF potential, current moves from terminal 78 toward the inverting input of op amp 46 with a current amplitude equal to the difference between the tapped absolute value signal at terminal 78 and VREF divided by the value of resistor 86.

Op amp 46 will drive its output terminal 156 in a negative direction to pull a current equivalent to the current through resistor 85 away from input terminal 88 thereby maintaining inverting input 88 at the same potential as the non-inverting input. The voltage across capacitor 92 is proportional to the integral of the current through it. Since the inverting input to the amplifier 88 is fixed in potential by operation of the zener reference circuit at voltage VREF, and if the voltage drop across the resistor 90 is temporarily neglected, the output voltage of the op amp 46 can be seen to be the sum of the fixed reference voltage VREF plus the voltage across capacitor 92.

The sum of the VREF voltage at the inverting input of op amp 46 plus the voltage across capacitor 92 provides the output voltage at terminal 156. The sum of the voltage VREF and the voltage across capacitor 92 is therefore proportional to the negative integral of the current through resistor 84 which is equal to the voltage across resistor 90. The amplitude control signal at the output of 156 is coupled to the input of the first network means resistors 54 at the left side and center of FIG. 6. The current through resistor 90 is proportional to the difference between the scaled absolute value signal at 78 and the reference voltage VREF. In view of the forgoing analysis, it can be seen that as the current passes through resistor 90 and capacitor 92 and as the voltage at the output terminal 56 moves below VREF, the voltage across the capacitor changes in proportion to the negative integral of the voltage difference between the scaled absolute value signal and the voltage reference VREF. Resistor 90 and capacitor 92 insert a zero at a break frequency of approximately 159 Hz. At frequencies a decade or more above this break frequency, the gain of the op amp 46 flattens out to be the quotient of resistor 90 divided by resistor 84.

Op amp 50 (e.g. LM 301A), in FIG. 5, is also a high gain operational amplifier operating in an integrator circuit to integrate current passing through resistor 94 on capacitor 96. Reference voltage VREF is coupled to the non-inverting input 80. Since both inputs of the op amp 50 operate at voltage VREF, the current through resistor 94 is the difference between the scaled filtered peak value signal and VREF divided by the resistance of resistor 94.

Resistors 102 and 104 form a gain control divider for feeding a percentage of the filtered peak value signal control signal to the inverting input of op amp 50. Diode 106 is forward biased and operates as a clamp as the voltage at the output terminal of op amp 50 rises positively to a value sufficient to forward bias diode 106. The feed back path through diode 106 is open for output voltages less positive than that required to forward the bias diode 106. The output terminal 101 is coupled to the CFS signal line at the top left corner of FIG. 6.

Referring now to FIG. 6, the two resistor dividers comprised of resistors 108-128 represent a series network means that responds to the amplitude control signal at terminal 56 and to the crest control signal at terminal 101 to provide a series of sine tap signals and a series of crest tap signals respectively from the tap terminals between each of the respective resistors. The first and second series network means are comprised respectively of a first network of series connected resistors within phantom block 54 and a second network of series connected resistors within phantom block 62.

Each sine tap signal is proportional to the product of the amplitude control signal times a respective predetermined ratio of the resistors within the first network of series connected resistors 54. Each crest tap signal is proportional to the amplitude of the crest control voltage times a respective predetermined ratio of the resistors in the second network of series connected resistors 62. The terms "sine tap" and "crest tap" as used in the context of this invention are meant to be descriptive of a staircase approximation of a half sine wave. The values to be used in an actual circuit application will depend on the dynamic response characteristics of the ac inverter to be controlled and the load, and the crest droop or clipping that is allowable. The values shown for the ladder resistors in FIG. 6 were empirically determined to be the best values for a particular ac inverter in which the circuit of FIGS. 5 and 6 were employed. The phrases "sine tap" and "crest tap", as used in the context of this specification are therefore meant to include ratios determined by analytic and empirical methods for the respective networks of series connected resistors.

Integrated circuit U3, as shown in FIG. 6, is a part of the phase signal source of the PWM 14 of FIG. 3. U3 is seen to comprise a ripple counter (e.g. CD 4040) for generating the required periodic series of phase signals to inputs A, B, C and D of the multiplexer 60. The three AND gates within the phantom block (e.g., Quad 2-input AND circuit CD 4081) respond to a 1111 output from the Q1-Q4 outputs of U3 to provide a reset signal to reset U3 to 0000 on the next clock signal into the IN input. The clock signal to U3 is synchronized to the period of the output voltage from the ac inverter. The clock signal is provided by the ac inverter circuit clock circuitry and is phase locked to the period of the line frequency and upshifted in frequency to precisely divide the period of the absolute value signal into the required number of phase intervals.

The phantom block containing the PWM in FIG. 6 receives the composite control signal from the invention crest factor correction circuit from the COM I/O signal line 34. The integrated circuit U5 is typically a comparator. One input to the comparator is driven by a triangular wave shape such as waveform (e) in FIG. 4b at the switching frequency of the PWM. The comparator signals the instant at which the ramp of the triangular wave exceeds the step value of the composite control signal.

The number of PWM switching cycles that take place in the course of one phase interval depends on the switching frequency that the PWM is designed to use and the duration of the phase interval. By way of illustration, if the ac inverter is providing 60 Hz power, the absolute value signal will have a period of 8.33 milliseconds. Each of the 15 phase intervals within the fixed period of 8.33 milliseconds will have a duration of approximately 556 microseconds. A 20 KHz PWM with period of 50 microseconds would complete approximately 11 power cycles interval.

The pulse width of the PWM modulator is established by the coincidence of the ramp with the amplitude of the composite control signal step value. Since the step value of the composite remains fixed during any phase interval, the duty ratio of the PWM will remain essentially fixed during each phase interval.

Switch S1 in FIG. 6 is shown in the normal operating position. Switch S1 is positioned to the TEST position during calibration.

The crest factor correction circuit invention is also adaptable to a process or software method for correcting the crest factor of a sinusoidal signal source having a fixed period. The program for the sinusoidal signal source supplies a periodic sequence of digital phase signals in the form of discrete signal on a bus for each fixed period, each successive phase signal within each periodic sequence being characterized to define a predetermined successive phase interval of the sinusoidal signal fixed period. The crest factor correction method would comprise steps as follows.

A. Sensing the signal source voltage from the output of an ac inverter by means of reading the digital output of a conventional analog to digital converter. The digital value of each sample is converted into a an absolute value signal, and stored in a memory location. Each sampled value is associated with a corresponding fixed interval within the fixed period of one half the period of said sinusoidal signal. Optical signal coupling could replace the function of the isolation transformer.

B. Providing an amplitude control signal proportional to the negative integral of the difference between the absolute value signal and a reference voltage by using conventional piecewise integration software.

C. Providing a scaled filtered peak value signal proportional to the filtered peak value of the absolute value signal. The scaled peak value signal is the stored value of the last peak value.

D. Providing a crest control signal proportional to the negative integral of the difference between the scaled filtered peak value of the absolute value signal and the sampled value of a predetermined reference voltage.

E. Providing a first and second set of sine tap signals from a first resistor ladder network. The first set of sine tap signals correspond in time to a leading phase interval. The second set of sine tap signals correspond in time to a lagging phase interval. Each set of sine tap signal is substantially proportional in amplitude to a respective predetermined ratio of the amplitude control signal driving the first resistor ladder network times the sine tap value of a corresponding phase interval.

F. Providing a set of crest tap signals from a second resistor ladder. Each crest tap signal corresponding in time to a crest phase interval. Each crest tap signal is substantially proportional to a respective predetermined ratio of the scaled crest value signal times the sine tap value of a corresponding crest phase interval.

G. Periodically coupling a first sequence of sine tap signals to an output bus followed by coupling a sequence of crest tap signals to said output bus followed by coupling a second sequence of sine tap signals to said output bus. Each sequence is coupled corresponding to a predetermined series of phase signals to form a periodic composite control signal.

The digital bus output signals would be converted by a digital to analog converter and coupled to the ac inverter control signal input. If the ac inverter is a digital control process, the output of the bus is not converted but is used directly in its digital form.

The embodiments of the invention described herein represent preferred embodiments, and variations and modifications will suggest themselves to those skilled in the pertinent arts. Some possible modifications have been mentioned above, including digitizing the output of the full-wave rectifier and performing each function in the topology of FIG. 3 as a subroutine or a method in a computer program with a microprocessor and outputting the composite control signal to the pulse width modulator control signal input to the ac inverter from the microprocessor via a digital to analog converter.

This and other modifications that may suggest themselves to those skilled in the pertinent arts should be considered within the spirit and scope of the present invention, as defined in the claims that follow.

What is claimed is:

1. A control circuit for providing a composite control signal to a control input of an ac inverter, said ac inverter providing an ac output from a dc power source, said control circuit comprising:
    A. first means, receiving said ac output of said ac inverter, for generating an amplitude control signal based on one of an average or RMS value of said ac output;
    B. second means, receiving said ac output of said ac inverter, for generating a crest control signal for controlling the amplitude of the peak value of said ac output; and
    C. means, connected to said first and second means and to said control input of said ac inverter, for feeding said amplitude control signal and said crest control signal to said control input of said ac inverter as said composite control signal.

2. A control circuit as recited in claim 1 further including means for rectifying said ac output to provide a rectified ac output, said rectifying means connected between said ac inverter and said first means, and
    wherein said first means includes means for generating said amplitude control signal based on an average value of said rectified ac output.

3. A control circuit as recited in claim 2 wherein said second means is connected to receive said rectified ac output and generates said crest control signal in response thereto.

4. A control circuit as recited in claim 3 wherein said second means includes peak detection means for determining the peak of said rectified ac output.

5. A control circuit as recited in claim 1 wherein said second means includes peak detection means for determining the peak of said ac output.

6. A method of controlling an ac inverter comprising the steps of:
    A. generating a first control signal from one of an average value signal or RMS value signal of an ac output of said ac inverter;
    B. generating a peak value signal of said ac output; and
    C. feeding said control signal and said peak value signal to a control input of said ac inverter for controlling same.

7. A crest factor correction circuit to provide a composite control signal to control the ac output voltage of an inverter, said crest factor correction circuit being responsive to an absolute value signal having a substantially fixed period, and to a periodic sequence of phase signals that divide each fixed period into predetermined phase intervals, said crest factor correction circuit comprising:
    an amplitude and crest factor signal means responsive to said absolute value signal for providing an amplitude control signal proportional to a negative integral of a difference between the absolute value signal and a precision reference voltage and for providing a crest control signal proportional to a negative integral of a difference between a peak value of the absolute value signal and said precision reference voltage;
    a series network means responsive to said amplitude control signal and to said crest control signal for providing a plurality of sine tap signals, each sine tap signal being proportional to a respective predetermined ratio of said amplitude control signal and for providing a plurality of crest tap signals, each crest tap signal being proportional to a respective predetermined ratio of said crest control signal; and a multiplexer means responsive to said periodic series of phase signals, to said sine tap signals and to said crest tap signals for sequentially coupling a first sequence of said sine tap signals to an output terminal followed by coupling a sequence of said crest tap signals to said output terminal followed by coupling a second sequence of said sine tap signals to said output terminal;

whereby, said sine tap signals and crest tap signals form said composite control signal.

8. The crest factor correction circuit of claim 7 wherein said series network means further comprises:
   a first series network means responsive to said amplitude control signal for providing said first and second sequences of sine tap signals;
   a second series network means responsive to said crest control signal for providing said sequence crest tap signals.

9. The crest factor correction circuit of claim 7 wherein said amplitude and crest factor signal means further comprises:
   a first capacitor;
   a first resistor divider network coupled to provide a ratio of said absolute value signal at a first terminal; and,
   a first operational amplifier having an inverting input, a non-inverting input and an output, said inverting input being coupled to said first resistor divider network first terminal, said capacitor being coupled between said inverting input and said output, said non-inverting input being coupled to said precision reference voltage;
   whereby, said first operational amplifier provides said amplitude control signal at said first operational amplifier output terminal.

10. The crest factor correction circuit of claim 9 wherein said amplitude and crest factor signal means further comprises:
    a peak detection circuit means responsive to said absolute value signal for providing a filtered peak value signal proportional to the peak value of said absolute value signal;
    a second capacitor;
    a second resistor divider network coupled to said filtered peak value signal to provide a filtered scaled peak value signal at a first terminal; and
    a second operational amplifier having an inverting input, a non-inverting input and an output, said inverting input being coupled to said first terminal of said second resistor divider network, said capacitor being coupled between said inverting input and said output, said non-inverting input being coupled to said precision reference voltage;
    whereby, said second operational amplifier provides said crest control signal at said second operational amplifier output.

11. The crest factor correction circuit of claim 10 wherein said series network means further comprises:
    a first network of series connected resistors, the first resistor in the series having a first terminal connected to a signal reference potential and the last resistor in the series being driven by said amplitude control signal, the values of each resistor in said first network of series connected resistors being predetermined to provide said sine tap signals at the junction of each respective pair of resistors; and
    a second network of series connected resistors, the first resistor in the series having a first terminal connected to a signal reference potential and the last resistor in the series being driven by said crest control signal, the values of each resistor in said second network of series connected resistors being predetermined to provide said crest tap signals at the junction of each respective pair of resistors.

12. The crest factor correction circuit of claim 11 wherein said multiplexer means further comprises:
    a multiplexer having binary control inputs coupled to receive said periodic sequence of phase signals, a first set of channel I/O input terminals coupled to said sine tap signals and a second set of channel I/O input terminals coupled to said crest tap signals for sequentially coupling said first sequence of said sine tap signals to an output terminal followed by coupling said sequence of crest tap signals to said output terminal followed by coupling said second sequence of said sine tap signals to said output terminal.

13. A crest factor correction circuit for providing a composite control signal to the duty cycle control input of an ac inverter to control the average output amplitude and the peak output amplitude of the output voltage of the ac inverter, said crest factor correction circuit also being responsive to a periodic sequence of phase signals, the period of each periodic sequence being synchronized with the period of the ac inverter output voltage, each successive phase signal within each periodic sequence being characterized to define a predetermined successive phase interval of an absolute value signal of said output voltage, said crest factor correction circuit comprising:
    a transformer having a primary coupled to be driven by the output voltage of said ac inverter and a secondary for providing a scaled isolated output voltage;
    a full-wave rectifier means responsive to said scaled isolated output voltage for providing said absolute value signal, said absolute value signal having a substantially fixed period;
    a first capacitor having a first and second terminal and a first compensation resistor having a first and second terminal;
    a first resistor divider network coupled to provide a predetermined ratio of said absolute value signal at a first terminal; and
    a first input resistor having a first and second terminal, said first terminal of said first input resistor being coupled to said first resistor divider first terminal;
    a first operational amplifier having an inverting input, a non-inverting input and an output, said inverting input being coupled to said first input resistor second terminal and said first operational output being coupled to said first capacitor first terminal, said first compensation resistor first terminal being coupled to said first capacitor second terminal and said first compensation resistor second terminal being connected to said non-inverting input, said first operational amplifier non-inverting input being coupled to a reference voltage, said first operational amplifier output terminal providing an amplitude control signal proportional to the negative integral of the difference between the absolute value signal and said precision reference voltage;

a peak detection circuit means responsive to said absolute value signal for providing a filtered peak value signal proportional to the filtered peak value of said absolute value signal;

a second resistor divider network coupled to said filtered peak value signal to provide a filtered scaled peak value signal at a first terminal;

a second input resistor;

a second capacitor;

a second operational amplifier having an inverting input, a non-inverting input and an output, said non-inverting input being coupled to a fixed voltage, said inverting input being coupled to said second resistor divider first terminal via said second input resistor, said capacitor being coupled between said second operational amplifier inverting input and said output, said second operational amplifier output providing a crest control signal proportional to the negative integral of the difference between the scaled filtered peak value of the absolute value signal and said fixed voltage;

a first series network means coupled to said amplifier control signal for providing a first set and a second set of sine tap signals; each sine tap signal within a set being proportional to a respective predetermined ratio of said amplitude control signal;

a second series network means responsive to said crest control signal for providing a set of crest tap signals, each crest tap signal within a set being proportional to a respective predetermined ratio said crest control signal;

a multiplexer means responsive to said periodic sequences of phase signals, to said first and second sets of sine tap signals and to said set of crest tap signals for sequentially coupling a first sequence of sine tap signals to an output terminal followed by coupling a sequence of crest tap signals to said output terminal followed by coupling a second sequence of sine tap signals to said output terminal;

whereby, each periodic set of said first sequence of sine tap signals, followed by said sequence of crest tap signals, followed by said second sequence of sine tap signals comprise said composite control signal.

* * * * *